United States Patent Office 3,154,550
Patented Oct. 27, 1964

3,154,550
EXTRACTION PROCESS FOR CHLORO-
SULFONATED QUINAZOLINONES
Gilmer T. Fitchett, Green Brook Township, Somerset
County, N.J., assignor to American Cyanamid Company, Stamford, Conn., a corporation of Maine
No Drawing. Filed Aug. 3, 1962, Ser. No. 214,538
7 Claims. (Cl. 260—251)

This invention relates to an improved process for the recovery of 2-alkyl-7-halo-1,2,3,4-tetrahydro-4-oxo-6-quinazolinesulfonyl chlorides, prepared by reacting the corresponding 2 - alkyl-7-halo-2,3-dehydro-4(1H)-quinazolinone with chlorosulfonic acid. More particularly, it is concerned with an improved solvent extraction process for the recovery of such products from an aqueous slurry obtained by diluting the reaction mass after chlorosulfonation.

Typical chlorosulfonation products with which the present invention is concerned are produced in accordance with the following reaction:

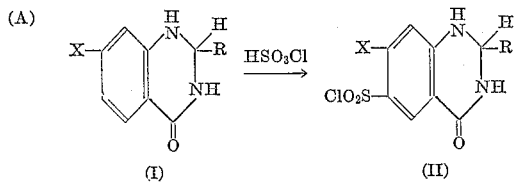

wherein R represents a lower alkyl group of from one to four carbon atoms and X represents a halogen, such as fluorine, chlorine or bromine. The quinazolinones of (I) are converted thereby to the 2-alkyl-7-halo-1,2,3,4-tetrahydro-4-oxo-6-quinazolinesulfonyl chlorides of (II).

For purposes of reference, this reaction is referred to below as "reaction (A)" or simply as "(A)." Similarly the starting materials will be referred to as "compounds (I)" or as "(I)"; the chlorosulfonated products as "compounds II" or "(II)."

As shown in the copending application Serial No. 214,-487, filed August 3, 1962, by H. G. Arlt and in my copending joint application with said H. G. Arlt and F. X. Markley, Serial No. 214,537, filed August 3, 1962; if an attempt is made to carry out reaction (A) the yield of chlorosulfonated product is generally too low. However, as also shown therein, when (A) is carried out in the presence of a suitable activator, such as for example $PCl_5$ or $SOCl_2$, markedly increased yields are obtainable.

Illustrative compounds (I) which may be chlorosulfonated in accordance with the process of the above-noted copending application (Serial No. 214,487) include 7-chloro-2-methyl-2,3-dihydro - 4(1H) - quinazolinone, 7-chloro - 2 - ethyl - 2,3 - dihydro - 4(1H) - quinazolinone, 7 - chloro - 2 - n - butyl - 2,3 - dihydro - 4(1H) - quinazolinone, 7 - bromo - 2 - methyl - 2,3 - dihydro - 4(1H)-quinazolinone, 7 - bromo - 2 - n - propyl - 2,3 - dihydro - 4(1H) - quinazolinone, 7 - fluoro - 2 - ethyl - 2,3-dihydro-4(1H)-quinazolinone, and the like.

Suitable compounds (I) may be readily prepared in known manner by reacting the corresponding 4-halo-2-aminobenzamide with an aliphatic aldehyde in the presence of toluenesulfonic acid. The aldehyde should contain one more carbon atom than does the desired 2-alkyl substituent. For example, when the aliphatic aldehyde is propionaldehyde, the product is 7-halo-2-ethyl-2,3-dihydro-4(1H) quinazolinone.

Such a product, wherein the 7-halo substituent is chlorine, is a typical starting material for reaction (A). Accordingly, herein, it will be used as illustrative for purposes of discussion, as will the resultant chlorosulfonated product of (II). For purposes of simplification only, these illustrative materials will be referred to by the symbols "QEC" and "QECS," respectively. It is to be understood, however, the general discussions are also applicable to other compounds of (I) and (II).

QECS, as an illustrative product of (A), is readily converted in solution in acetone or isopropyl acetate to a known sulfonamide of the formula

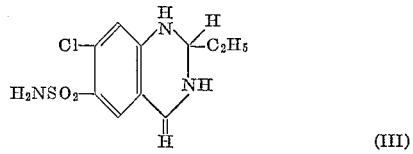

by treatment with ammonia. Other compounds of (II), prepared according to the above-noted application, yield corresponding sulfonamides. The latter are known, useful compounds, as shown for example in U.S. Patent No. 2,976,289.

Although forming part of the subject matter of the above-noted application Serial No. 214,537, and therefore not claimed herein, from the foregoing discussion it would appear that a direct, three-step synthesis from a 2-amino-4-halo-benzamide to the corresponding desired sulfonamide should be available. Therein, the above-noted improved procedure for (A) of Serial No. 214,487 constitutes the second step. By its use, the improvements in overall results make the three-step synthesis a valuable alternative to previously-known more complex routes. One such route and perhaps the best previously available, is that shown in the above-noted U.S. Patent No. 2,976,289.

However, before such a synthesis can utilize QECS produced in the improved second step, the QECS must be separated from the reaction mixture in which it is formed. One such method is shown in the above-noted applications. Therein the reaction mixture is diluted by pouring it into an ice and water mixture. The resultant slurry then is extracted with a suitable water-immiscible organic solvent ester such as isopropyl acetate or sec.-butyl acetate. Esters of higher water-miscibility, such for example as ethyl acetate, are less effective and undesirable. After extraction, the QECS-containing extract is then worked up in whatever manner may be desired. One such procedure is the direct conversion of the chlorosulfonated product to the corresponding sulfonamide discussed above.

Surprisingly, however, it was found that when the solvent ester extraction is attempted on a large scale suitable for commercial development, the results are uncertain and often unsatisfactory. In some few cases, such extraction may be found to be fairly successful. More often, however, the solvent extracts were found to contain far less of compounds (II) than known to have been produced in carrying out the first step, i.e., reaction (A). It was found that after diluting the chlorosulfonated reacted mixture with ice and water, as described above; extraction becomes progressively less satisfactory as the time period before extraction can be completed is extended. Extraction is found to be satisfactory only when it can be completed within a time period too short for practical operation on a commercial scale. Such variable results seriously interfere with commercial utilization of the overall synthesis. Unfortunately, in practical operation such time delays are not readily avoidable.

It is, therefore, a major object of the present invention to provide an improved extraction process which is not subject to this drawback of uncertain success in extraction. Surprisingly, this has been successfully accomplished by combining with the previously-employed, water-immiscible solvent esters noted above, a suitable amount of a water-soluble aliphatic ketone solvent such as acetone.

This result is particularly surprising in view of the fact that previous attempts to use more water-miscible esters such as ethyl acetate proved unsatisfactory. Surprisingly, the combined solvent extracting medium of the present invention does not undergo loss by water dissolution of the water-soluble ketone, as was to be expected from the above-noted prior experience with such water-miscible solvents as ethyl acetate.

In accordance with this invention, the solvent mixture used for the improved extraction comprises two essential components, the ester and the ketone. As the ester component may be used the lower alkyl esters of lower alkanoic acids, particularly acetic and propionic acids. As the solvent esters of choice, isopropyl and secondary butyl acetates are preferred. If so desired, a mixture of such esters may be used. However, the ester or esters used should be less water-miscible than is ethyl acetate.

As to the ketone, it should be an aliphatic ketone of less than six carbon atoms. These include, for example, acetone, methyl ethyl ketone and diethyl ketone. These three constitute the preferred group. If so desired, a mixture of such ketones may be used without departing from the scope of the invention.

In accordance with this invention, the ester or esters should be utilized with the ketone or ketones in the correct proportions. In parts by weight, this ester: ketone ratio may vary from about 0.5:1 to about 15:1. Generally, a more limited weight ratio range of from about 1:1 to about 5:1 will be found to be good practice. It constitutes the preferred mode of operation.

Both components of the lixiviating solvent mixture may be present when, as discussed above, the QECS-containing reaction product mixture is diluted with the ice and water. This, however, is not critical. Only one may be present before dilution. One or both may be added after dilution. In general, addition after dilution is preferred. It is also good practice in such cases to add the ester and ketone either successively in that order or as a previously-formed admixture.

Assigning a numerical value to the total amount of solvent to be utilized is substantially impossible. It will vary with such factors as the solvents weight ratio and the extracting procedure. The latter may be carried out, for example, in a multi-step batch operation; in a stepwise continuous operation or in a direct continuous extraction.

Solvent recovery, or rather solvent loss into the aqueous phase, also depends on such a number of variables that numerical designations have little or no limiting meaning. It depends for example on such factors as the solubility of the selected solvents in each other and in water, the soluble salt content and acidity of the aqueous phase and the like.

The invention will be further demonstrated in conjunction with the following illustrative examples. Therein, unless otherwise noted, all parts and percentages are by weight and temperatures are in degrees centigrade. Products such as QECS, being acid chlorides are difficult to isolate per se. In the examples, therefore, the products are concerted to sulfonamides for purposes of recovery and assay.

Example 1

100 parts of phosphorus pentachloride is slowly added to 200 parts of chlorosulfonic acid while keeping the temperature below 20° C. 60 parts of QEC is added slowly over about one hour while maintaining the temperature at 20 to 25° C. by external cooling. The resulting reaction mixture is then stirred for three hours at 22 to 25° C. and then poured into a mixture of 200 parts of water, 80 parts of sodium chloride, 400 parts of secondary butyl acetate and 280 parts of acetone, keeping the temperature between 0° and 5° C. by external cooling with cold brine and internal cooling with ice. The aqueous layer is allowed to settle and is drained off and reextracted with about 400 parts of secondary butyl acetate.

The combined organic extracts are cooled to minus 10° C. and anhydrous ammonia is introduced below the surface at a temperature below 25° C. until no further evidence of reaction is noticeable. After removal of the excess ammonia, 500 parts of water is added. The crude product is isolated by filtration. By analysis, it contains 53 parts of real 7-chloro-2-ethyl - 2,3 - dihydro-4(1H)-quinazoline-6-sulfonamide. Based on the quinazoline starting material, the yield is 64% of theory.

Example 2

A portion of product obtained in Example 1 is dissolved in water with the aid of sodium hydroxide and the solution is treated with activated carbon, diatomaceous earth and a small amount of sodium hydrosulfite. The product is reprecipitated by addition of hydrochloric acid to a pH of 4.5 to 5.0. The melting point of the purified product is 250.5° C. to 251° C. With a 96% recovery in the purification process, the overall yield of 7-chloro-2-ethyl-2,3-dihydro-4(1H)-quinazoline - 6 - sulfonamide, based on the quinazoline starting material, is 57.6% of theory.

Example 3

64.3 parts (0.54 mol) of thionyl chloride is slowly added to 126 parts (1.08 mols) of chlorosulfonic acid while keeping the temperature below 20° C. 57.0 parts (0.27 mol) of QEC is added slowly over about one hour while maintaining the temperature at 15° to 25° C. by external cooling. The resulting reaction mixture is then stirred for three hours at 20° to 25° C. and then poured into a mixture of 200 parts of water, 75 parts of sodium chloride, 450 parts of secondary butyl acetate and 150 parts of acetone, keeping the temperature from 0° to 5° C. by internal cooling with the ice and external cooling with brine. The aqueous layer is allowed to settle and is drained off and re-extracted with 150 parts of secondary butyl acetate. The QECS content of the combined extracts indicates a conversion of QEC to QECS of about 55 percent.

Example 4

The combined organic extracts obtained in Example 3 are cooled to minus 5° C. and anhydrous ammonia is introduced below the surface until no further evidence of reaction is noticeable. After removal of the excess ammonia, the reaction mixture is diluted with water to a total volume equal to that occupied by about 1,000 parts of water. The crude product is isolated by filtration, washed and dried. It amounted to about 38.5 parts (49.4% of theory). After further purification (by the procedure described in Example 2) the overall yield is 47.0% of theory.

Example 5

The procedure of Example 1 is followed except the completed reaction mixture is poured into a mixture of 200 parts of water, 80 parts of salt and 500 parts of isopropyl acetate. 730 parts of acetone is then added.

The crude amination product contains 48 parts of real 7-chloro - 2 - ethyl - 2,3 - dihydro-4(1H)-quinazoline-6-sulfonamide (58% of theory).

Example 6

The procedure of Example 1 is followed substituting an equal amount of methyl ethyl ketone for the acetone. Analogous results are obtained.

I claim:

1. In a solvent process for extracting 2-alkyl-7-halo-1,2,3,4 - tetrahydro - 4 - oxo - 6 - quinazolinesulfonyl chloride from a low-solids content aqueous slurry thereof, the improved method which comprises using as the extracting solvent medium, for each hundred parts of chlorosulfonated product quinazolinone to be extracted, a sufficient amount of mixture of (a) lower-alkyl ester of a lower alkanoic acid, said ester being less water-miscible than ethyl acetate, and (b) a ketone from the group consisting of acetone, methyl ethyl ketone and diethyl ketone; said ester and said ketone being present in weight ratio of from about 0.5:1 to about 15:1.

2. A process according to claim 1 in which said ratio is from about 1:1 to about 5:1.

3. A process according to claim 1 in which said ketone is acetone.

4. A process according to claim 1 in which said ketone is methyl ethyl ketone.

5. A process according to claim 1 in which said ketone is diethyl ketone.

6. A process according to claim 1 in which said ester is isopropyl acetate.

7. A process according to claim 1 in which said ester is sec.-butyl acetate.

References Cited in the file of this patent

FOREIGN PATENTS 752,572   Germany _____ Jan. 4, 1954